United States Patent

Nagano et al.

[11] Patent Number: 4,726,401
[45] Date of Patent: Feb. 23, 1988

[54] FIXED PLUG ASSEMBLY

[75] Inventors: Shuji Nagano; Shuichiro Ida, both of Toyota; Toshio Yoshinaka, Nagoya, all of Japan

[73] Assignee: Toyota Jidosha Kabushiki Kaisha, Toyota, Japan

[21] Appl. No.: 884,613

[22] Filed: Jul. 11, 1986

[30] Foreign Application Priority Data

Aug. 5, 1985 [JP] Japan ............... 60-120165[U]

[51] Int. Cl.⁴ .................................. F16L 55/10
[52] U.S. Cl. ................................ 138/89; 138/108; 215/296
[58] Field of Search .............. 138/89, 89.4, 108; 215/274, 280, 287, 296, 298, 294; 220/309, 323, 326, 278, 284

[56] References Cited

U.S. PATENT DOCUMENTS

| | | | |
|---|---|---|---|
| 692,526 | 2/1902 | Kimball | 220/284 |
| 746,330 | 12/1903 | Hicks | 215/274 |
| 1,037,751 | 9/1912 | Gardner | 215/296 |
| 1,353,878 | 9/1920 | West | 138/89.4 |
| 1,379,676 | 5/1921 | Brenner | 138/89.4 |
| 2,258,852 | 10/1941 | Horn et al. | 220/309 |
| 3,072,287 | 1/1963 | Sampson | 220/309 |
| 3,175,853 | 3/1965 | Gilbertson | 220/326 |
| 3,269,581 | 4/1965 | Calder | 220/284 |
| 4,140,239 | 2/1979 | Mercier et al. | 215/274 |
| 4,244,479 | 1/1981 | Smalley | 215/274 |

FOREIGN PATENT DOCUMENTS

| | | |
|---|---|---|
| 58-130160 | 9/1983 | Japan . |
| 59-15853 | 1/1984 | Japan . |
| 59-29458 | 2/1984 | Japan . |

Primary Examiner—Henry J. Recla
Assistant Examiner—L. J. Peters
Attorney, Agent, or Firm—Oblon, Fisher, Spivak, McClelland & Maier

[57] ABSTRACT

The device for fixing a plug and the like comprises a spring member which is constituted by a plurality of radially deformable claws with their free ends engageable with an arresting stepped portion formed in an inserting hole in which the plug is fixed and a body integral with the claws and deformable in the direction in which the plug is urged so as to position the plug in position.

1 Claim, 4 Drawing Figures

FIXED PLUG ASSEMBLY

BACKGROUND OF THE INVENTION

1. Field of the Invention

The present invention relates to a fixed plug assembly and the like in a transmission of a vehicle.

2. Description of the Prior Art

A method such as press-fitting, calking, projection weld and the like has generally been practiced in fixing an end cover, a plug, a sealing plug and the like in position in a product. Such a method, however, has a relatively low reliability for hermetically sealing a pressurized liquid and the components fixed by such a method can not be disassembled, reused, and the place in which such a method is applicable is limited. An O-ring has also been used which is easily removed and has a high reliability. However, such an O-ring requires provision of a separate fixing means, and, when a snap ring such as disclosed in Japanese Utility Model Application Laid Open No. 59-15853 and Japanese Utility Model Application laid Open No. 59-29458, for example, is used, attachment and removal of such a snap ring are troublesome, because the operability for compresisng the same is low, while the place in which the snap ring is used is limited. Further, it is also disclosed in Japanese Utility Model Application Laid Open No. 58-130160 to provide a removal preventing plate integrally formed with a plug for preventing the plug from being removed. However, in such a device, since two members are integrally secured together, the construction thereof is complicated and it can not be used commonly in various kinds of products and it tends to cause chattering after attachment thereof.

SUMMARY OF THE INVENTION

It is, therefore, an object of the present invention to provide a fixed assembly and the like which is simple in construction and easily attached and removed without causing chattering after attachment thereof.

The present invention is characterized by the construction in which a stepped portion is formed in an insert hole for fixing a plug and the like therein, which a spring member is provided which resiliently presses and secures the plug in position in the insert hole, the spring member comprising a plurality of claws radially deformable with the free ends thereof engageable with the stepped portion and a body integrally formed with the claws and deformable in the direction in which the plug is resiliently urged.

With the above described construction of the device of the present invention, since the spring member is constructed by the radially deformable claws and the body integrally formed therewith and deformable in the direction in which the plug is urged, the construction is rendered to be simple, while no chattering will occur after attachment of the plug using the device of the present invention, because the fixing of the plug is effected by the spring force of the body and the fixing of the spring member is effected by the spring force of each claw, while the attachment and the removal of the plug can be easily effected by merely moving the claws to disengage the same from the stepped portion.

BRIEF DESCRIPTION OF THE DRAWINGS

The drawings illustrate an embodiment of the present invention in which.

DETAILED DESCRIPTION OF THE PREFERRED EMBODIMENT

Figure 1:
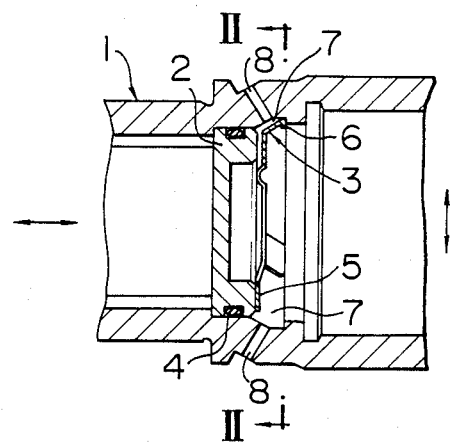
FIG. 1 is a sectional view showing the main portions of the fixing device of the plug.

Now, the present invention will be described below with reference to an embodiment thereof illustrated in the drawings.

In FIG. 1, a hollow element is a shaft 1 for use in a transmission of a vehicle is shown. A plug 2 and a spring plate 3 are arranged in the shaft 1. The shaft 1 has an inner peripheral sealing surface with which the plug 2 is fitted and an inner peripheral conical surface contiguous to the sealing surface. The end of the conical surface opposite to the end contiguous tot he sealing surface is formed with a stepped portion or groove 7, the purpose of which will be described later. Pin inserting holes 8 are formed across the conical surface. The plug 2 is formed with an annular recess in the outer periphery thereof in which an O-ring 4 is fitted. The O-ring 4 abuts against the cylindrical inner sealing surface within the shaft 1 to form a hermetically sealing construction.

Figure 2:
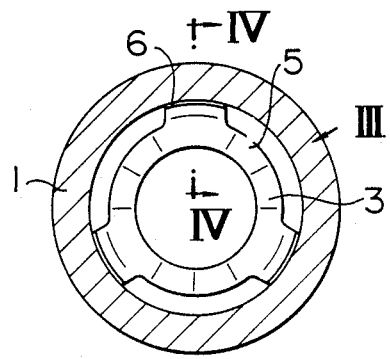
FIG. 2 is a sectional view taken along line II—II in FIG. 1.
Figure 3:
FIG. 3 is a fragmentary side view as seen in the direction of III in FIG. 2.
Figure 4:
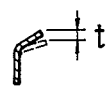
FIG. 4 is a sectional view taken along line IV—IV in FIG. 2.

The spring plate 3 comprises a body 5 in the form of doughnut and three radial claws 6 integral with the body 5 as shown in FIG. 2. The claws 6 are positioned circumferentially equally spaced from each aother by the angle of 120 degrees around the outer periphery of the body 5 and they are radially deformable as shown in Fig. 4. The body 5 has bent portions bent in the direction in which it urges the plug 2 as shown in FIG. 3.

Thus, when the spring plate 3 is located in the inserting hole in the shaft 1 as shown in FIG. 1, the plug 2 is first inserted into the inserting hole of shaft 1 so as to bring the O-ring 4 in engagement with the inner sealing surface of the shaft 1, and then the spring plate 3 is pressed into the shaft 1 with the claws 6 being oriented to the rear side. Thus, the tip of each claw 6 is snugly fitted within the stepped portion or groove 7 formed at the end of the conical surface, so that the plug 2 is fixed in position with the plug 2 being resiliently urged by the spring plate 3. That is, the bent portions of the body 5 the spring plate 3 urge the plug 2 in position by virtue of the spring force of the body 5 of the spring plate 3 produced by the amount s of the bending thereof to thereby prevent chattering of the plug 2 as shown in FIG. 3, while the claws 6 engaging with the groove 7 prevent the spring plate 3 from being removed from the shaft 1 by virtue of the spring force of each claw 6 caused by the amount t of radial deformation thereof in the groove 7 insuring the engagement of the claws 6 with the groove 7 as shown in FIGS. 1 and 4.

When the spring plate 3 is to be removed, a pin (not shown) is inserted into each of the pin inserting holes 8 formed in the shaft 1 extending radially obliquely across the conical surface so as to disengage each claw 6 from the groove 7, thereby permitting the plug 2 and the spring plate 3 to be easily removed from the shaft 1.

What is claimed is:

1. A fixed plug assembly comprising:
    a hollow element defining an inserting hole having a sealing surface and a stepped portion, said sealing surface being axially inwardly displaced from the stepped portion in the inserting hole, a plug inserted in said inserting hole; and a spring member resiliently pressing said plug against said sealing surface in a pressing direction, said plug and said spring member being non-integral, said spring member comprising:

(a) a resilient body in the form of a doughnut having bent portions for pressing on said plug, and (b) a plurality of resilient claws extending radially from said body and having free ends engaged with sad stepped portion, said hollow element having at least a pin inserting hole at a position corresponding to each of said claws, whereby said bent portions press said plug against said sealing surface and said claws retain said spring member in said inserting hole, and a pin inserted in any said pin inserting hole can disengage a corresponding one of said claws from said stepped portion for releasing said spring member.

* * * * *